US008808427B2

(12) United States Patent
Leitgeb et al.

(10) Patent No.: US 8,808,427 B2
(45) Date of Patent: Aug. 19, 2014

(54) PROCESS AND APPARATUS FOR THE TREATMENT OF A CARBON DIOXIDE-CONTAINING GAS STREAM FORM A LARGE-SCALE COMBUSTION PLANT

(75) Inventors: Paul Leitgeb, Pullach (DE); Werner Sebastian Leitmayr, Neuburg/Donau (DE); Torsten Stoffregen, Dresden (DE); Roland Ritter, Dresden (DE)

(73) Assignee: Linde Aktiengesellschaft, Munich (DE)

( * ) Notice: Subject to any disclaimer, the term of this patent is extended or adjusted under 35 U.S.C. 154(b) by 189 days.

(21) Appl. No.: 13/139,784

(22) PCT Filed: Nov. 26, 2009

(86) PCT No.: PCT/EP2009/008447
§ 371 (c)(1),
(2), (4) Date: Jun. 15, 2011

(87) PCT Pub. No.: WO2010/072305
PCT Pub. Date: Jul. 1, 2010

(65) Prior Publication Data
US 2011/0247491 A1  Oct. 13, 2011

(30) Foreign Application Priority Data
Dec. 16, 2008  (DE) .......... 10 2008 062 497

(51) Int. Cl.
*B01D 53/047*  (2006.01)
*F25J 3/04*  (2006.01)
*F25J 3/06*  (2006.01)
*F25J 3/02*  (2006.01)

(52) U.S. Cl.
CPC .......... *B01D 53/047* (2013.01); *F25J 2260/80* (2013.01); *Y02C 10/12* (2013.01); *F25J 2205/40* (2013.01); *F25J 2210/70* (2013.01); *F25J 2245/58* (2013.01); *F25J 2210/04* (2013.01); *Y02C 10/08* (2013.01); *B01D 2256/22* (2013.01); *F25J 2220/82* (2013.01); *F25J 2245/50* (2013.01); *B01D 2257/504* (2013.01); *F25J 2205/66* (2013.01); *F25J 2245/02* (2013.01); *F25J 3/04181* (2013.01); *F25J 3/067* (2013.01); *F25J 2245/42* (2013.01); *F25J 3/04533* (2013.01); *F25J 2205/60* (2013.01); *F25J 3/0266* (2013.01)
USPC .......................................... 95/139; 423/230

(58) Field of Classification Search
USPC .......... 95/92, 96, 139, 236; 96/108, 134, 243; 423/220, 226, 228, 229, 230; 62/600, 62/617
See application file for complete search history.

(56) References Cited

U.S. PATENT DOCUMENTS

| | | | |
|---|---|---|---|
| 4,952,223 A | | 8/1990 | Kirshnamurthy et al. |
| 5,411,721 A | * | 5/1995 | Doshi et al. ................ 423/220 |
| 7,850,763 B2 | * | 12/2010 | White et al. ................ 95/174 |
| 8,216,344 B2 | * | 7/2012 | Degenstein et al. ........ 95/129 |
| 2002/0073845 A1 | | 6/2002 | Reddy |
| 2008/0173585 A1 | | 7/2008 | White et al. |
| 2008/0184880 A1 | | 8/2008 | Fan et al. |
| 2010/0024476 A1 | * | 2/2010 | Shah ............................ 62/617 |

FOREIGN PATENT DOCUMENTS

WO  2006106253 A2  10/2006

OTHER PUBLICATIONS

World IP Organization. "International Search Report". PCT/EP2009/008447. Applicant: Linda-KCA-Dresden GMBH. Mailed: Feb. 18, 2010.

* cited by examiner

*Primary Examiner* — Frank Lawrence
(74) *Attorney, Agent, or Firm* — Millen, White, Zelano & Branigan, P.C.

(57) ABSTRACT

The invention relates to a process and an apparatus for the treatment of a carbon dioxide-containing gas stream from a large-scale combustion plant, in particular of a power station. The gas stream is separated in a carbon dioxide purification stage R into a gas substream having an increased carbon dioxide content and a gas substream having a reduced carbon dioxide content. The gas substream having an increased carbon dioxide content is fed to a further use and/or storage S. In particular, compression of the carbon dioxide under the ground can reduce the emission of gases which affect the climate. To increase the proportion of compressible $CO_2$, it is proposed that the gas substream having a reduced carbon dioxide content is fed to a pressure swing adsorption stage PSA in which a fraction which is rich in carbon dioxide and a fraction which is low in carbon dioxide are produced. The fraction which is rich in carbon dioxide is recirculated to the carbon dioxide purification stage R or is passed directly to further use and/or storage S.

24 Claims, 3 Drawing Sheets

Figure 1:
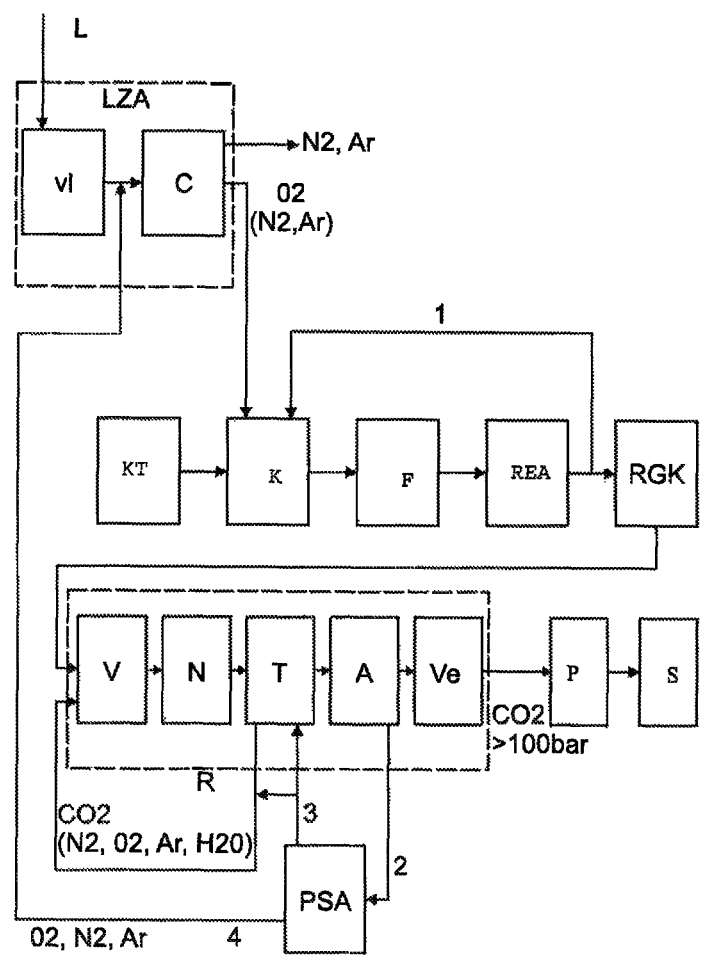

PROCESS AND APPARATUS FOR THE TREATMENT OF A CARBON DIOXIDE-CONTAINING GAS STREAM FORM A LARGE-SCALE COMBUSTION PLANT

The invention relates to a process for the treatment of a carbon dioxide-containing gas stream from a large-scale combustion plant, in particular of a power station, where the gas stream is separated in a carbon dioxide purification stage into a gas substream having an increased carbon dioxide content and a gas substream having a reduced carbon dioxide content and the gas substream having an increased carbon dioxide content is passed to further use and/or storage, and also an apparatus for carrying out the process.

Carbon dioxide-containing gas streams are obtained in all large-scale combustion plants which are operated using fossil fuels such as coal, petroleum or natural gas. These include power stations in particular, but also industrial furnaces, steam boilers and similar large-scale thermal plants for power and/or heat generation. Owing to the adverse effect of carbon dioxide gas on the climate, there is a search for solutions which enable emissions of carbon dioxide-containing offgases into the atmosphere to be reduced.

New power station concepts in which the fossil fuel, e.g. coal, is burnt using an oxygen-rich combustion gas, in particular technical-grade oxygen or oxygen-enriched air, (oxygen combustion gas process) have recently been proposed. The oxygen content of this combustion gas is, for example, from 95 to 99.9% by volume. The offgas formed which is also referred to as flue gas, contains mainly carbon dioxide ($CO_2$) in a proportion of about 70-85% by volume. The aim of these new concepts is to compress the carbon dioxide which is formed in the combustion of the fossil fuels and is present in a high concentration in the flue gas in suitable underground formations, in particular in certain rock strata or strata conducting salt water and thus to limit carbon dioxide emission into the atmosphere. The climate-damaging effect of greenhouse gases such as carbon dioxide are to be reduced as a result. Such power stations are referred to in technical speech as "oxyfuel" power stations.

In the concepts known hitherto, dust removal, removal of nitrogen oxides and desulphurization of the flue gas are carried out in successive steps. Subsequent to this flue gas purification, the carbon dioxide-rich offgas which has been treated in this way is compressed and fed to a carbon dioxide purification stage. A gas substream having a reduced carbon dioxide content and another gas substream having an increased carbon dioxide content are typically produced there by means of a cryogenic separation process. The gas substream having an increased carbon dioxide content represents the desired carbon dioxide product stream which is obtained with a carbon dioxide content of, for example, more than 95% by volume and is intended for further utilization, in particular for transport to storage reservoirs. The gas substream having a reduced carbon dioxide content is obtained as secondary stream (known as vent gas) at from 15 to 30 bar, preferably 18-25 bar, and contains predominantly the constituents not intended for compressed storage, in particular inert gases such as nitrogen ($N_2$) and argon (Ar) and also oxygen ($O_2$). However, proportions of carbon dioxide are also still present in this gas substream in a concentration of about 25-35% by volume. This vent gas is at present released into the atmosphere. This reduces the degree of possible utilization and compressed storage of the carbon dioxide. This degree of $CO_2$ utilization is also referred to as $CO_2$ recovery ratio. The recovery ratio r is defined as the ratio of purified $CO_2$ obtained to the $CO_2$ formed in the combustion process, multiplied by the factor 100:

$$r = \frac{CO_2(\text{recovered and purified})}{CO_2(\text{formed})} \times 100$$

The introduction of the oxyfuel technology has the objective of achieving very high $CO_2$ recovery ratios, i.e. to produce as much $CO_2$ as possible in the required quality for compressed storage and at the same time reduce the amount of environmentally damaging $CO_2$ (greenhouse gas) as emission into the atmosphere. Efforts at present assume that the $CO_2$ recovery ratio should be at least 90%.

This recovery ratio can be influenced by the $CO_2$ content of the flue gas, by the type of process and by the energy, consumption.

Apart from $CO_2$ in a concentration of about 75-90% by volume (preferably from 75 to 85% by volume), the following further components are found in the raw gas: nitrogen, oxygen, argon and traces of carbon monoxide, sulphur oxide and nitrogen oxide. Since the $CO_2$ product should have a $CO_2$ content of >95% by volume, the inert constituents have to be reduced. This leads to part of the $CO_2$ also being lost together with the inerts which are separated off in the cryogenic purification. This means that the desire for $CO_2$-free power stations has hitherto not been able to be fulfilled, but at best low-$CO_2$ power stations have been able to be realised.

In the paper presented at "Purification of Oxyfuel-Derived $CO_2$; IEAGHG International Oxy-Combustion Network, Yokohama, Japan, 5/6 Mar. 2005; Vince White (Air Products PLC, UK)", it was proposed that the oxygen be recovered from the vent gas by means of a membrane unit and recirculated to the oxyfuel power station and mixed into the combustion gas. The remaining gas with the remaining amounts of $CO_2$ is released into the atmosphere.

It is an object of the present invention to configure a process of the type mentioned at the outset and also an apparatus for carrying out the process so as to increase the $CO_2$ recovery ratio.

This object is achieved in terms of a process by the gas substream having a reduced carbon dioxide content being fed to a pressure swing adsorption stage in which a fraction which is rich in carbon dioxide and a fraction which is low in carbon dioxide are produced.

The fraction which is rich in carbon dioxide can be recirculated to the carbon dioxide purification stage or be passed directly to further use and/or storage.

The carbon dioxide purification stage which is used for producing a usable or storable, in particular compressible, $CO_2$ product and is configured, for example, as a cryogenic carbon dioxide liquefaction plant is thus extended by a pressure swing adsorption stage (pressure swing adsorption plant or PSA). In the pressure swing adsorption stage, the vent gas which is normally released into the atmosphere is worked up to form a fraction which is rich in carbon dioxide and a fraction which is low in carbon dioxide (in particular containing about 500 ppmv of $CO_2$). The fraction which is rich in carbon dioxide has a $CO_2$ content of, in particular, more than 85% by volume and is recirculated to the carbon dioxide purification plant as additional feed gas. This makes it possible to achieve a significant increase in the recovery ratio compared to conventional processes which operate without a pressure swing adsorption stage. It is in this way possible to achieve $CO_2$ recovery ratios of as much as 99% in large-scale combustion plants which are operated as oxyfuel plants.

The carbon dioxide purification stage typically comprises compression of the gas stream so that a precompressed gas substream having a reduced carbon dioxide content (vent gas) is obtained under a pressure of preferably 15-30 bar, particularly preferably 18-25 bar, is obtained and can be fed to the pressure swing adsorption stage. This makes it possible to employ a pressure swing adsorption stage without further compression.

An air fractionation plant is usually used for providing the combustion gas having an increased oxygen content which is required for oxyfuel plants. In this case, the gas stream is formed by a carbon dioxide-containing offgas stream from a large-scale combustion plant in which fossil fuels are burnt using a combustion gas which is produced in an air fractionation plant and has an oxygen content higher than that of air. In a particularly preferred embodiment of the invention, the fraction which is low in carbon dioxide from the pressure swing adsorption stage is in this case recirculated to the air fractionation plant. In this way, the fraction which is low in carbon dioxide and consists essentially of nitrogen, oxygen and argon can be reused in the overall power station process. This fraction contains oxygen (in particular about 12-25% by volume) and is preferably already compressed so that this gas mixture can be integrated into the process of the air fractionation plant. In particular, this fraction can be introduced into a previously compressed feed gas stream to the air fractionation plant. This reduces the proportion of recirculated oxygen in the compression of air for the air fractionation plant and enables compression energy to be saved.

The carbon dioxide purification stage advantageously comprises a drying stage, in particular an adsorptive drying stage, for drying the gas stream. In this case, preference is given to at least part of the fraction which is rich in carbon dioxide and/or that which is low in carbon dioxide from the pressure swing adsorption stage being used as regeneration gas for the drying stage. Here, the required pressure can be provided by the pressure swing adsorption stage.

Any temperature fluctuations resulting from use of the gas fraction as regeneration gas (e.g. during heating and cooling of the adsorbers) can be evened out by recirculating part of the gas stream flowing out from the drying stage to a raw gas cooling stage (in particular flue gas condensation) preceding the carbon dioxide purification stage or feeding it back into the gas stream upstream of the gas stream compression and thus contributing to mixing of the $CO_2$ raw gas stream and making it uniform.

Particularly when the fraction which is low in carbon dioxide is used as regeneration gas for the drying stage before it is introduced into the air fractionation plant, any temperature fluctuations resulting from the use as regeneration gas are preferably evened out by feeding part of the gas stream flowing out from the drying stage into a direct cooling stage of the air fractionation plant.

The carbon dioxide purification stage advantageously encompasses a multistage gas stream compression. In this case, the fraction which is rich in carbon dioxide from the pressure swing adsorption stage is preferably fed into the gas stream upstream of the first stage of the gas stream compression. At an increased delivery pressure from the pressure swing adsorption state, this fraction can also be fed at a pressure of more than 2 bar, in particular from 2 to 4 bar, into the gas stream downstream of the first stage of the gas stream compression. In the case of introduction downstream of the first compressor stage, the compression energy for $CO_2$ recirculation can be reduced.

The invention further provides an apparatus for the treatment of a carbon dioxide-containing gas stream from a large-scale combustion plant, in particular a power station, having a carbon dioxide purification facility supplied with the gas stream, a discharge line for a gas substream having an increased carbon dioxide content and a discharge line for a gas substream having a reduced carbon dioxide content, wherein the discharge line for the gas substream having an increased carbon dioxide content is connected to a utilization facility and/or a storage reservoir.

In terms of the apparatus, the stated object is achieved by the discharge line for the gas substream having a reduced carbon dioxide content being connected to a pressure swing adsorption plant which has a discharge line for a fraction which is rich in carbon dioxide and a discharge line for a fraction which is low in carbon dioxide, wherein the discharge line for the fraction which is rich in carbon dioxide is connected to the carbon dioxide purification facility. In oxyfuel plants, the large-scale combustion plant is usually connected to an air fractionation plant for producing a combustion gas having an oxygen content which is higher than that of air. In this case, it is proposed that the discharge line of the pressure swing adsorption plant for the fraction which is low in carbon dioxide be connected to the air fractionation plant.

In addition, the carbon dioxide purification facility preferably comprises a gas stream compression facility.

Furthermore, the discharge line of the pressure swing adsorption plant for the fraction which is low in carbon dioxide is advantageously connected to a discharge line of a compressor of the air fractionation plant.

The carbon dioxide purification facility typically comprises a drying facility, in particular a drying facility having an adsorber, for drying the gas stream. In this case, it is proposed that the drying facility be connected directly via a line to the pressure swing adsorption plant. The drying facility can also be connected directly via a line to a gas stream feed line of a compressor of the carbon dioxide purification facility located upstream of the drying facility. Another variant provides for the drying facility to be connected directly via a line to a raw gas cooling facility located upstream of the carbon dioxide purification facility.

According to a further development of the inventive concept, the carbon dioxide purification facility comprises a plurality of compressors or compressor stages and the discharge line of the pressure swing adsorption plant for the fraction which is rich in carbon dioxide is connected to a gas stream feed line to the first compressor or compressor stage or to a gas stream transfer line from the first compressor or from the first compressor stage to the second compressor or to the second compressor stage.

The invention provides the possibility of significantly increasing the $CO_2$ recovery ratio in large-scale combustion plants, in particular power stations, which operate, for example, according to the oxyfuel technology. As a result, a larger proportion of carbon dioxide can be compressed in rock strata or underground strata which conduct salt water, so that less carbon dioxide is emitted into the atmosphere. A significant contribution to reducing the greenhouse effect can be achieved in this way. At the same time, there is the possibility of likewise integrating a previously compressed gas stream having an oxygen content of about 12-25% by volume into the overall process in order to reduce the compressor energy in the air fractionation plant by an amount corresponding to the amount of oxygen in the gas stream.

The invention is suitable for all conceivable large-scale combustion plants in which carbon dioxide-containing gas streams are obtained. These include, for example, power stations operated using fossil fuels, industrial furnaces, steam boilers and similar large-scale thermal plants for power and/or heat generation. The invention can be used particularly advantageously in large-scale combustion plants which are supplied with technical-grade oxygen or oxygen-enriched air as combustion gas and in which off gas streams having high carbon dioxide concentrations are accordingly obtained. The invention is particularly suitable for low-$CO_2$ coal-fired power stations which are operated using oxygen as combustion gas ("oxyfuel" power stations) and in which the carbon dioxide present in high concentration in the offgas is separated off and compressed underground ("$CO_2$ capture technology").

The invention and further embodiments of the invention are illustrated below with the aid of the examples presented schematically in the figures.

Figure 2:
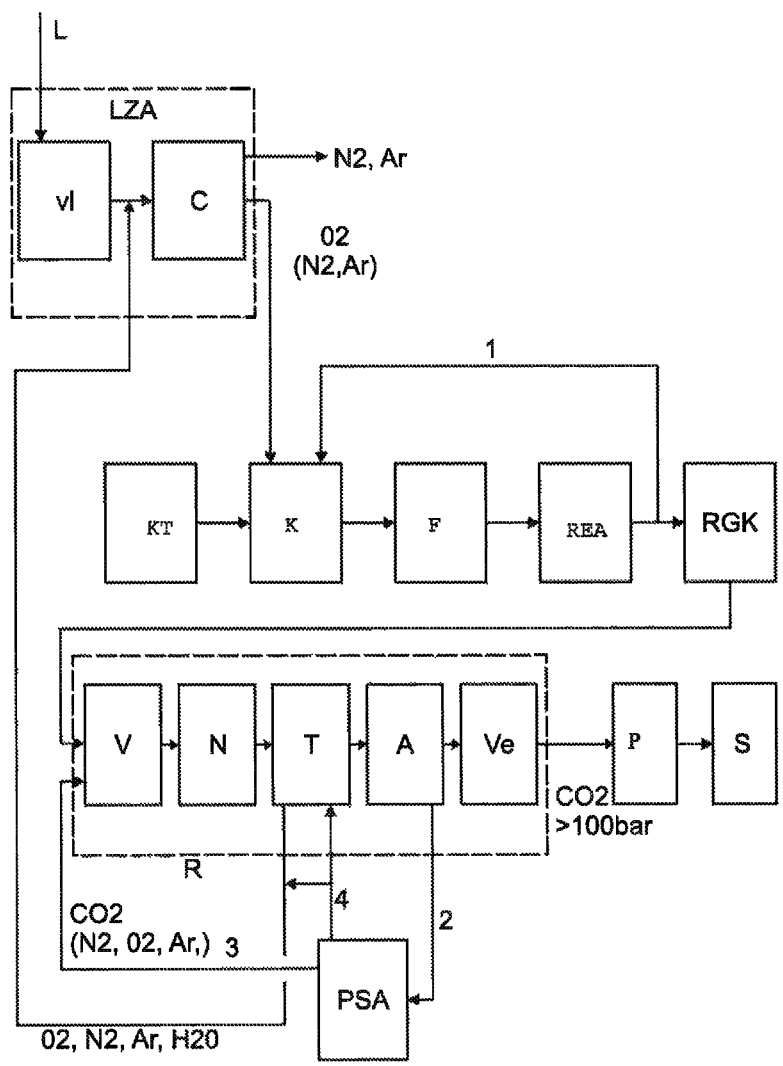
Figure 3:
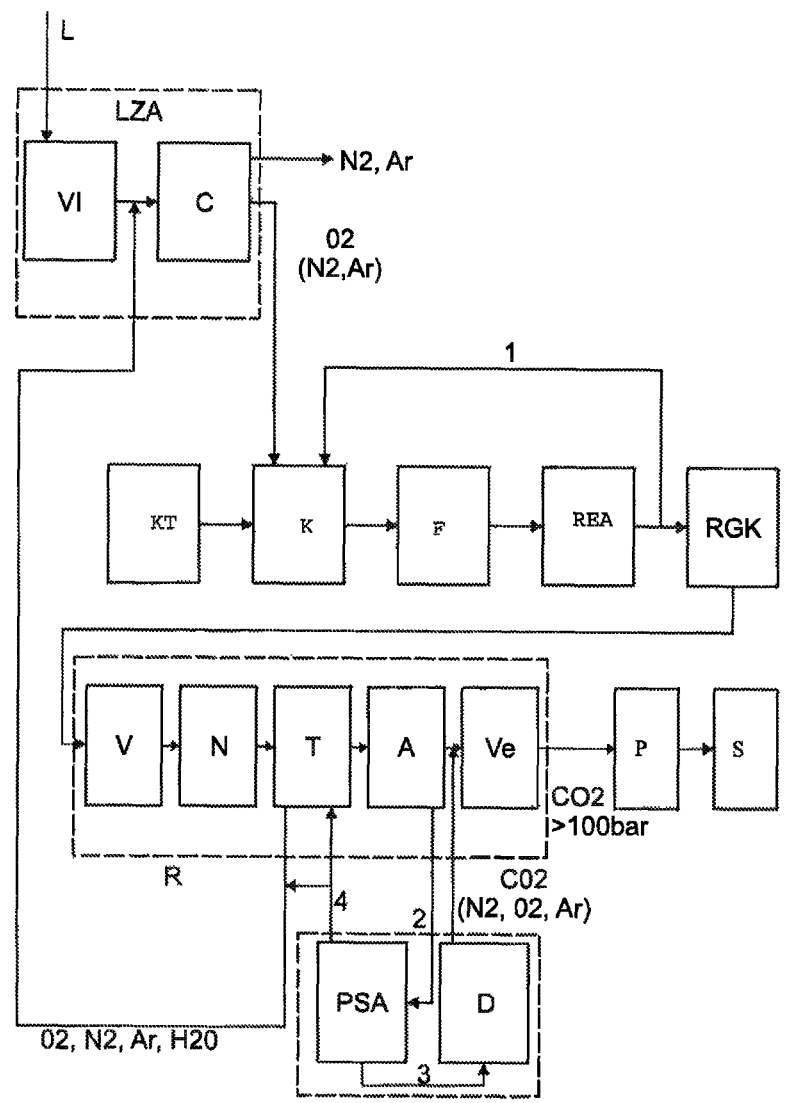

In the figures:

FIG. 1 shows a block flow diagram of integration of a pressure swing adsorption plant into an oxyfuel power station with dryer regeneration by means of the $CO_2$-rich fraction FIG. 2 shows a block flow diagram of integration of a pressure swing adsorption plant into an oxyfuel power station with dryer regeneration by means of the low-$CO_2$ fraction FIG. 3 shows a block flow diagram of integration of a pressure swing adsorption plant into an oxyfuel power station with direct supply of the $CO_2$-rich fraction to the storage The present example relates to a coal-fired power station which is operated using a combustion gas having an oxygen content of about 95% by volume and in which an offgas stream enriched with carbon dioxide is treated for compression underground. In FIG. 1, a combustion chamber K of the coal-fired power station is supplied with coal from a coal drying facility KT. In the combustion chamber K, the coal is burnt by means of a combustion gas which has an oxygen content of about 95% by volume and also contains proportions of nitrogen, oxygen and argon (about 5% by volume). The combustion gas is generated from the ambient air L in an air fractionation plant LZA which comprises an air compressor VI and a precooling stage, an adsorber station and a coldbox C. The offgas (flue gas) from the combustion chamber K is conveyed via a filter F and purified in a downstream flue gas desulphurization plant REA. Part of the gas stream which has been purified in this way is recirculated via a $CO_2$ return line 1 to the combustion chamber K. The remaining gas stream goes into a flue gas cooling stage RGK. The cooled gas stream is fed to a carbon dioxide purification stage R which comprises a precompression V, a DeNOx N and drying T and also a separation A and final compression Ve. In the separation A, a gas substream having an increased carbon dioxide content and a gas substream having a reduced carbon dioxide content are obtained. The gas substream having an increased carbon dioxide content is the desired $CO_2$ product stream which is finally fed at a pressure of above 100 bar into a pipeline P and transported to a storage S. As storage S, it is possible to use, for example, an underground stratum which conducts salt water or an underground rock stratum. The gas substream having a reduced carbon dioxide content (vent gas) which is obtained as secondary stream is fed at a pressure of about 15 bar via line 2 to the pressure swing adsorption plant PSA. In the pressure swing adsorption plant PSA, a fraction which is rich in carbon dioxide and a fraction which is low in carbon dioxide are produced. The fraction 3 which is rich in carbon dioxide is recirculated at a pressure of more than 2 bare to the carbon dioxide purification stage R, as a result of which the proportion of $CO_2$ in the $CO_2$ product stream to the pipeline P and thus the $CO_2$ recovery ratio are ultimately increased. The fraction 3 which is rich in carbon dioxide can firstly also be used as regeneration gas for the drying stage T, which comprises an adsorber station, present in the carbon dioxide purification stage R. For this purpose, a substream of the fraction 3 which is rich in carbon dioxide is fed directly to the adsorber station of the drying stage T. Another substream having a $CO_2$ content of about 90% by volume and containing proportions of $N_2$, $O_2$ and Ar is recirculated at atmospheric pressure to the precompression V. The fraction 4 which is low in carbon dioxide obtained in the pressure swing adsorption plant PSA, which has a $CO_2$ content of about 500 ppm and contains proportions of $O_2$, $N_2$ and Ar, is recirculated at a pressure of more than 6.5 bare to the air fractionation plant LZA and, after the air compression LV, fed into the feed gas stream to the air fractionation plant.

The variant depicted in FIG. 2 differs from that shown in FIG. 1 in that the fraction 4 which is low in carbon dioxide from the pressure swing adsorption plant PSA is used for regenerating the adsorbers of the drying stage T before being recirculated to the air fractionation plant LZA, while the $CO_2$-rich fraction 3 is recirculated directly to the precompression V.

Finally, FIG. 3 shows a variant in which the fraction 3 which is rich in carbon dioxide from the pressure swing adsorption plant is, after a pressure increase stage D, fed directly to the final compressor Ve for supply to the storage S. The fraction 4 which is low in carbon dioxide is used for regenerating the adsorbers of the drying stage T. This variant is particularly suitable when a purity of the $CO_2$-rich fraction which corresponds to the requirements for the $CO_2$ product is achieved, e.g. by use of a vacuum pressure swing adsorption plant (VPSA). In this case, the $CO_2$-rich fraction can be brought directly by a pressure increase stage to the inlet-side pressure level of the final compression Ve, so that recirculation via the $CO_2$ purification steps V, N, T and A can be omitted. In this way, the load on these purification steps can be decreased.

The invention claimed is:

1. A process for the treatment of a carbon dioxide-containing gas stream from a large-scale combustion plant, in particular of a power station, said process comprising:

separating said carbon dioxide-containing gas stream in a carbon dioxide purification stage (R) into a gas substream having an increased carbon dioxide content and a gas substream having a reduced carbon dioxide content, passing the gas substream having an increased carbon dioxide content from said carbon dioxide purification stage (R) to further use and/or storage, feeding the gas substream having a reduced carbon dioxide content to a pressure swing adsorption stage (PSA) in which a fraction (3) which is rich in carbon dioxide and a fraction (4) which is low in carbon dioxide are produced, and recirculating the fraction (3) which is rich in carbon dioxide to the carbon dioxide purification stage (R), wherein the gas stream is a carbon dioxide-containing offgas stream produced from a large-scale combustion plant in which fossil fuels are burnt by a combustion gas which is produced in an air fractionation plant (LZA) and which has an oxygen content higher than that of air, and wherein the fraction (4) which is low in carbon dioxide from the pressure swing adsorption plant (PSA) is recirculated to the air fractionation plant (LZA).

2. The process of claim 1, wherein the gas substream having an increased carbon dioxide content is passed from said carbon dioxide purification stage (R) to further use and/or storage.

3. The process of claim 1, wherein the carbon dioxide purification stage (R) comprises a gas stream compression (V) so that a precompressed gas substream having a reduced carbon dioxide content is fed to the pressure swing adsorption stage (PSA).

4. The process of claim 1, wherein the fraction (4) which is low in carbon dioxide from the pressure swing adsorption stage (PSA) is introduced into a previously compressed feed gas stream to the air fractionation plant (LZA).

5. The process of claim 1, wherein the carbon dioxide purification stage (R) comprises a drying stage (T), for drying the gas stream, and at least part of the fraction (3) Which is rich in carbon dioxide and/or the fraction (4) which is low in carbon dioxide from the pressure swing adsorption stage (PSA) is used as regeneration gas for the drying stage (T).

6. The process of claim 5, wherein the carbon dioxide purification stage (R) comprises a gas stream compression (V) so that a precompressed gas substream having a reduced carbon dioxide content is fed to the pressure swing adsorption stage (PSA), and a portion of the regeneration gas stream flowing out from the drying stage of the carbon dioxide purification stage (R) is fed back into the gas stream upstream of the gas stream compression (V).

7. The process of claim 5, wherein a portion of the regeneration gas stream flowing out from the drying stage of the carbon dioxide purification stage (R) is recirculated to a raw gas cooling stage (RGK) upstream of the carbon dioxide purification stage (R).

8. The process of claim 5, wherein a portion of the regeneration gas stream flowing out from the drying stage of the carbon dioxide purification stage (R) is recirculated to a direct cooling stage of the air fractionation plant (LZA).

9. The process of claim 1, wherein the carbon dioxide purification stage (R) comprises a multistage gas stream compression (V) and the fraction (3) which is rich in carbon dioxide from the pressure swing adsorption stage (PSA) is fed into the gas stream upstream of the first stage of the multistage gas stream compression (V).

10. The process of claim 1, wherein the carbon dioxide purification stage (R) comprises a multistage gas stream compression (V) and the fraction (3) which is rich in carbon dioxide from the pressure swing adsorption stage (PSA) is fed at a pressure of more than 2 bar into the gas stream downstream of the first stage of the multistage gas stream compression (V).

11. An apparatus for the treatment of a carbon dioxide-containing gas stream from a large-scale combustion plant, said apparatus comprising:
a carbon dioxide purification facility to which the carbon dioxide-containing gas stream is supplied,
a discharge line for discharging a gas substream having an increased carbon dioxide content from said carbon dioxide purification facility,
a discharge line for discharging a gas substream having as reduced carbon dioxide content from said carbon dioxide purification facility,
said discharge line for the gas substream having an increased carbon dioxide content is connected to a utilization facility and/or a storage reservoir, and
said discharge line for the gas substream having a reduced carbon dioxide content is connected to a pressure swing adsorption plant (PSA) which has a discharge line for a fraction which is rich in carbon dioxide and a discharge line for a fraction which is low in carbon dioxide,
wherein the discharge line for a fraction which is rich in carbon dioxide is connected to the carbon dioxide purification facility (R), and
wherein carbon dioxide-containing gas stream is provided by a carbon dioxide-containing an off-gas line from a large-scale combustion plant in which fossil fuels are burnt by a combustion gas which is produced in an air fractionation plant (LZA) and which has an oxygen content higher than that of air, and
wherein said discharge line (4) for a fraction which is low in carbon dioxide is connected to the air fractionation plant (LZA).

12. The apparatus of claim 11, wherein the carbon dioxide purification stage (R) comprises a gas stream compression facility (V) and wherein the discharge line (3) for the fraction which is rich in carbon dioxide is connected to the carbon dioxide purification facility (R) upstream of the gas stream compression facility (V).

13. The apparatus of claim 11, wherein the carbon dioxide purification stage (R) comprises a gas stream compression facility (V) and a final gas stream compression (Ve) downstream of the gas stream compression facility (V), and wherein the discharge line (3) for the fraction which is rich in carbon dioxide is connected to the carbon dioxide purification stage (R) at a point upstream of the gas stream compression facility (V) and upstream of the final gas stream compression (Ve).

14. The apparatus of claim 11, wherein the fractionation plant (LZA) comprises an air compressor (VI) and the discharge line for the fraction which is low in carbon dioxide is connected to the air fractionation plant (LZA) downstream of the air compressor (VI).

15. The apparatus of claim 11, wherein the carbon dioxide purification facility (R) comprises a gas stream compression facility (V).

16. The apparatus of claim 11, wherein the air fractionation plant (LZA) comprises an air compressor (VI), and the discharge line of for the fraction which is low in carbon dioxide is connected to a discharge line of said air compressor (VI) of the air fractionation plant (LZA).

17. The apparatus of claim 11, wherein the carbon dioxide purification facility (R) comprises a drying facility (T) for drying the gas stream, and the drying facility (T) is connected directly via a line to the pressure swing adsorption plant (PSA).

18. The apparatus of claim 17, wherein the drying facility (T) is connected directly via a line to a gas stream feed line of a compressor (V) of the carbon dioxide purification facility (R) upstream of the drying facility (T).

19. The apparatus of claim 17, wherein the drying facility (T) is connected directly via a line to a raw gas cooling facility (RGK) upstream of the carbon dioxide purification facility (R).

20. The apparatus of claim 11, wherein the carbon dioxide purification facility (R) comprises a plurality of compressors (V) and the discharge line (3) for the fraction which is rich in carbon dioxide is connected to a gas stream feed line to the first compressor of said plurality of compressors (V) or to a gas stream transfer line from the first compressor of said plurality of compressors (V) to the second compressor of said plurality of compressors (V).

21. The process of claim 1, wherein the fraction (4) has a carbon dioxide content of about 500 ppmv.

22. The process of claim 5, wherein the drying stage (T) is an adsorptive drying stage.

23. The apparatus of claim 17, wherein the drying facility (T) comprises adsorbers.

24. A process for the treatment of a carbon dioxide-containing gas stream from a large-scale combustion plant, in particular of a power station, said process comprising:

separating said carbon dioxide-containing gas stream in a carbon dioxide purification stage (R) into a gas substream having an increased carbon dioxide content and a gas substream having a reduced carbon dioxide content, passing the gas substream having an increased carbon dioxide content from said carbon dioxide purification stage (R) to further use and/or storage, feeding the gas substream having a reduced carbon dioxide content to a pressure swing adsorption stage (PSA) in which a fraction (3) which is rich in carbon dioxide and a fraction (4) which is low in carbon dioxide are produced, and increasing the pressure of the fraction (3) which is rich in carbon dioxide and then passing the pressurized fraction (3) rich in carbon dioxide to further use and/or storage, and wherein the gas stream is a carbon dioxide-containing off-gas stream produced from a large-scale combustion plant in which fossil fuels are burnt by a combustion gas which is produced in an air fractionation plant (LZA) and which has an oxygen content higher than that of air, and wherein the fraction (4) which is low in carbon dioxide from the pressure swing adsorption plant (PSA) is recirculated to the air fractionation plant (LZA).

* * * * *

UNITED STATES PATENT AND TRADEMARK OFFICE
CERTIFICATE OF CORRECTION

PATENT NO.      : 8,808,427 B2
APPLICATION NO. : 13/139784
DATED           : August 19, 2014
INVENTOR(S)     : Leitgeb et al.

Page 1 of 1

It is certified that error appears in the above-identified patent and that said Letters Patent is hereby corrected as shown below:

In the Claims

Column 6, line 66, Claim 2 reads "carbon dioxide purification stage (R) to further use and/or" should read -- carbon dioxide purification stage (R) to --

Column 7, line 12, Claim 5 reads "the gas stream, and at least part of the fraction (3) Which is" should read -- the gas stream, and at least part of the fraction (3) which is --

Column 7, line 54, Claim 11 reads "a discharge line for discharging a gas substream having as" should read -- a discharge line for discharging a gas substream having a --

Column 8, line 35, Claim 16 reads "charge line of for the fraction which is low in carbon dioxide" should read -- charge line for the fraction which is low in carbon dioxide --

Signed and Sealed this
Fourth Day of August, 2015

Michelle K. Lee
*Director of the United States Patent and Trademark Office*